United States Patent

[11] 3,581,585

| [72] | Inventor | Joseph K Barnoski<br>319 Lorenzo Place, Elmira, N.Y. 14901 |
|---|---|---|
| [21] | Appl. No. | 827,816 |
| [22] | Filed | May 26, 1969 |
| [45] | Patented | June 1, 1971 |

[54] HARMONIC OSCILLATOR APPARATUS
9 Claims, 12 Drawing Figs.

[52] U.S. Cl.................................................. 74/98
[51] Int. Cl.......................................... F16h 21/44
[50] Field of Search............................... 74/98, 96; 308/194

[56] References Cited
UNITED STATES PATENTS

| 806,708 | 12/1905 | Perry | 74/98 |
| 2,031,618 | 2/1936 | Robins | 308/194 |
| 2,490,624 | 12/1949 | Forwald | 74/96 |
| 2,683,026 | 7/1954 | Preszler | 308/194 |
| 2,870,650 | 1/1959 | Stump et al. | 74/98 |

Primary Examiner—Fred C. Mattern, Jr.
Assistant Examiner—Wesley S. Ratliff, Jr.
Attorney—Shoemaker & Mattare ABSTRACT: An input shaft and an output shaft are so interrelated that the axis of the input shaft is disposed at right angles to and intersects the axis of the output shaft. Means is provided for oscillating the input shaft. An eccentric connecting means is connected with the input shaft and extends laterally thereof. This eccentric connecting means is movably connected with a clevis which is pivotally interconnected with the output shaft. Means is provided in one form of the invention for adjusting the connection between the eccentric connecting means and the clevis.

INVENTOR
JOSEPH K. BARNOSKI

BY *Shoemaker and Mattare*

ATTORNEYS

PATENTED JUN 1 1971

INVENTOR
JOSEPH K BARNOSKI

BY Shoemaker and Mattare

ATTORNEYS

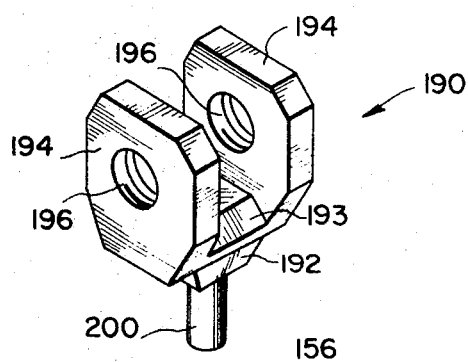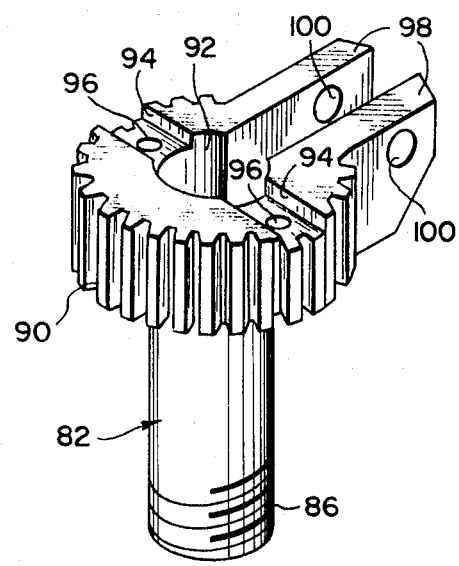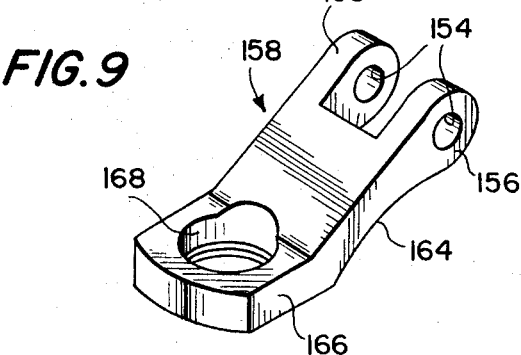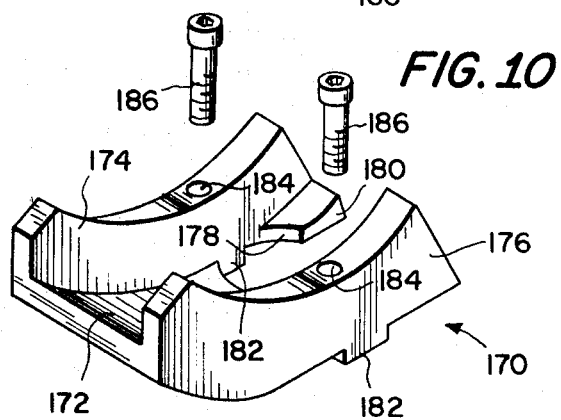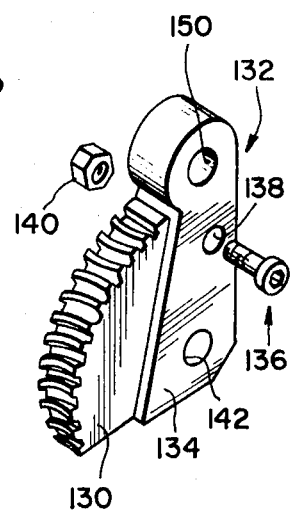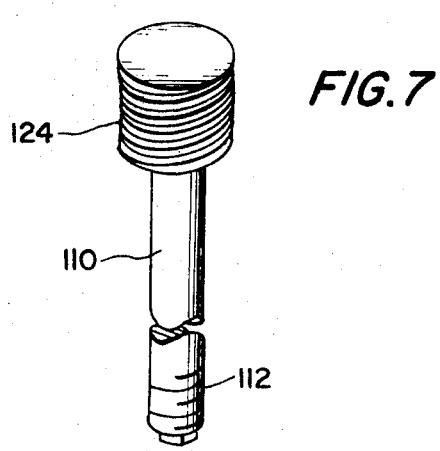
INVENTOR
JOSEPH K. BARNOSKI

HARMONIC OSCILLATOR APPARATUS

BACKGROUND OF THE INVENTION

The present invention relates to apparatus for converting substantially uniform and relatively constant oscillatory movement of an input shaft directly to harmonic oscillatory movement of an output shaft. In the past, devices for producing such harmonic oscillation of an output shaft have employed cam followers in a slot such as a scotch-yoke arrangement, racks and pinion gears, and long connecting linkage bars. Such prior art constructions have not proved satisfactory due to the excessive complexity and bulk of such arrangements as well as excessive wear which occurs during operation thereof.

Prior art constructions of this nature have presented a serious problem since the components thereof generally require accurate alignment of the parts, and accordingly such constructions must be manufactured to close tolerances thereby increasing the cost of manufacture.

Additionally, many conventional devices of this type do not provide a means for positively mechanically locking the output shaft under load at the start and stop positions of each cycle of operation. This can cause serious problems in the event of a fluid power failure under a static load.

A further problem commonly encountered with prior art constructions is the fact that inertia forces are transmitted from the output shaft back to the input shaft or the operator. This often produces shock forces in fluids within the apparatus with attendant leakage and distortion of piston seals and the like. Additionally, known arrangements do not provide sufficient starting torque at the beginning of a cycle in order to overcome friction and to accelerate the load up to speed. Furthermore, the speed of oscillation which can be obtained with known arrangement such as a conventional rack and pinion construction are limited for any given level of shock force on the mechanism.

SUMMARY OF THE INVENTION

The present invention provides a very compact construction wherein 180° of substantially uniform and relatively constant oscillatory movement of the input shaft can be converted directly to harmonic oscillatory movement of the output shaft through a range of approximately 0° to 120°. This is accomplished without the necessity of employing cam followers in a slot, rack and pinion gears, or long connecting linkage bars as used in the prior art.

In the present invention, an input shaft is disposed relative to an output shaft such that the axis of the input shaft is at right angles with the axis of the output shaft, with the axes of the two shafts intersecting one another. An eccentric connecting means is secured to the input shaft and is movably interconnected with an output connecting means in the form of a clevis which is further pivotally interconnected with the output shaft.

The motion of the apparatus is transmitted entirely through oscillating bushings in the form of spherical bearings which offer a number of advantages. This type of bushing is inexpensive to manufacture and requires minimum operating clearance thereby reducing "slop" in the output shaft. Such bushings have a greater load-carrying capacity due to the fact that area contact is provided instead of line contact as in the case of a roller in a slot. Such bushings will provide longer life and require less maintenance due to the fact that the rubbing surfaces are continuously mated with one another and there is no bearing surface exposed to pick up foreign matter or to lose lubrication such as a bushing sliding on a shaft or a cam follower operating in a slot. The utilization of spherical bearing means enables a relatively large amount of misalignment to be tolerated without binding or overloading parts of the mechanism.

A particular feature of the present invention is the fact that at the start and stop positions of each cycle, the output shaft is mechanically locked from turning no matter how much load is applied thereto from any direction. The input shaft must actually be rotated about 5° or 10° in order for the output shaft to be unlocked. This provides a fail-safe feature in the event of a fluid power failure or the like under a static load.

Inertia loads produced by movement of the load are generally blocked out to the input shaft as the oscillation of the apparatus completes the second half of each cycle. All inertial forces are dissipated in the apparatus at the end of the cycle and cannot be transmitted to the input shaft or the operator. This substantially reduces shock forces in fluids associated with the apparatus.

Starting torque is very high at the beginning of the cycle of operation and helps to overcome "break-away" friction and to accelerate the load up to speed. At the midpoint of the cycle, the output torque is equal to he input torque less friction, and at all other times the output torque is greater than the input torque.

The "self-generating" harmonic motion of the apparatus of the present invention enables loads to be oscillated at much higher speeds for any given level of shock force on the mechanism as compared to apparatus which does not have harmonic motion such as a conventional rack and pinion oscillation. The oscillation of the output shaft can be magnified to any desired amount by connecting conventional change gear mechanism to the output shaft.

In a modified form of the invention, means is provided for selectively adjusting the position of the connection between the eccentric connecting means and the clevis so that the amplitude of oscillation of the output shaft may be readily adjusted within relatively wide limits.

BRIEF DESCRIPTION OF THE DRAWINGS

FIGS. 6—11 inclusive are perspective views of various components of the structure shown in FIG. 4.

DESCRIPTION OF THE PREFERRED EMBODIMENTS

Figure 1:
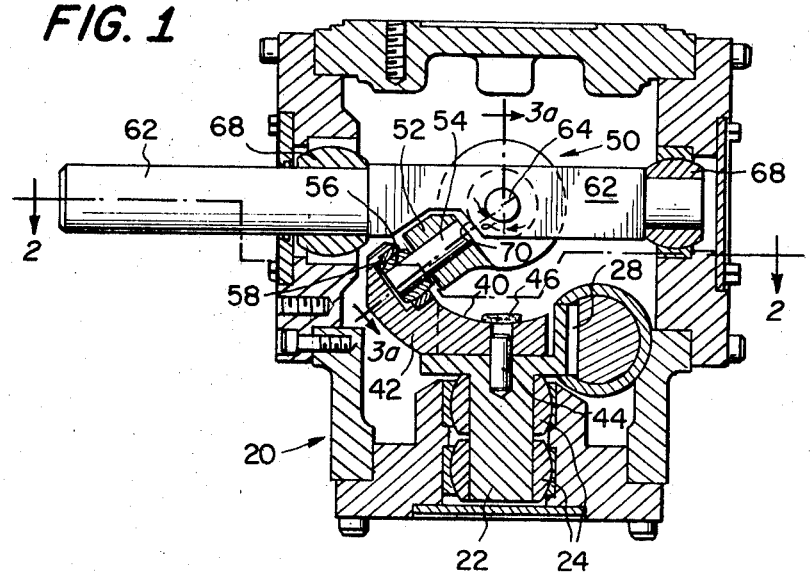
FIG. 1 is a vertical section through a first form of the present invention.
Figure 2:
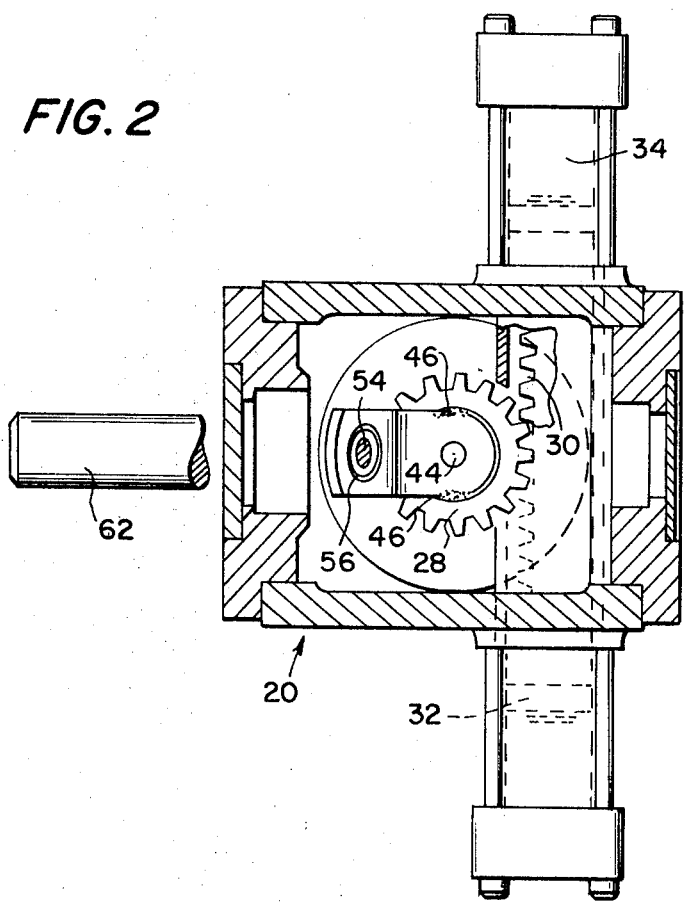
FIG. 2 is a sectional view taken substantially along line 2–2 of FIG. 1 looking in the direction of the arrows.

Referring now to the drawings wherein like reference characters designate corresponding parts throughout the several views, a first form of the invention is illustrated in FIGS. 1—3a inclusive. As seen in these figures, a housing is indicated generally by reference numeral 20, and an input shaft 22 is journaled in the housing by spherical bearings 24, whereby the input shaft is adapted to be oscillated during operation of the structure.

The upper end of the input shaft 22 is enlarged and defines a pinion portion 28 which is adapted to mesh with a rack portion 30 formed on a piston 32. Piston 32 is mounted for reciprocation within a cylinder 34. Suitable fluid pressure is applied to opposite ends of the cylinder to produce substantially uniform reciprocation of the piston 32 in a well-known manner. Such reciprocation the piston 32 back and forth within the associated cylinder will produce substantially uniform and relatively constant oscillatory movement of the input shaft.

The pinion portion 28 of the input shaft is provided with a cutout 40 within which is disposed an eccentric connecting means 42 in the form of a rigid arm which is pinned at 44 to the input shaft. In addition, this arm is tack welded as indicated at 46 to rigidly secure the arm to the input shaft.

An output connecting means indicated generally by reference numeral 50 comprises a body 52 having a pin 54 extending therefrom, this pin having the outer end thereof journaled within a spherical bearing 56 supported within a recess 58 formed in the other end of arm 42. In this manner, the output connecting means 50 is movably interconnected with arm 41. Body 52 is provided with a cutout 53 at one side thereof to provide clearance with respect to the output shaft hereinafter described.

Figure 3:
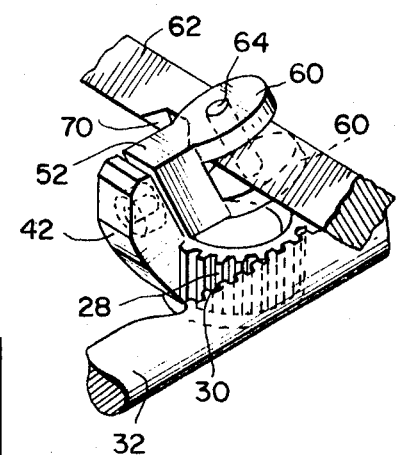
FIG. 3 is a top perspective view of a portion of the structure shown in FIG. 1.
Figure 3A:
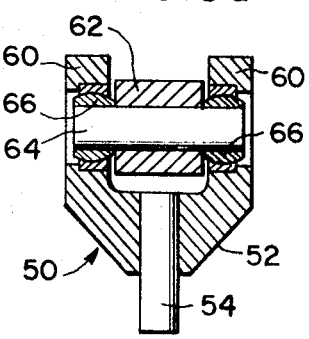
FIG. 3a is a sectional view taken substantially along line 3a–3a OF FIG. 1 looking in the direction of the arrows.

As seen in FIG. 3a, the body portion 52 of the output connecting means 50 includes a pair of spaced arms 60 disposed on opposite sides of an output shaft 62. Arms 60 are interconnected with the output shaft through the intermediary of a pivot pin 64 which is journaled within spherical bearings 66 supported within the two arms 60. In this manner, the output connecting means is pivotally interconnected with the output shaft for pivotal movement about an axis extending substantially perpendicular to the axis of the output shaft. It is apparent that the output connecting means comprises a clevis which is pivotally connected with the output shaft.

As seen in FIG. 1, output shaft 62 is journaled for rotation within spherical bearings 68 mounted within housing 20, the output shaft extending outwardly of the housing whereby it may be suitably interconnected with any desired load. The output shaft is provided with a cutout 70 which cooperates with cutout portion 53 of the clevis to provide clearance with the clevis at the midpoint in the cycle of operation of the apparatus.

At the start of a cycle of operation of the apparatus, pin 54 of the clevis is disposed at an angle of 90° to the output shaft as shown in FIG. 3. The axis of the input shaft is always disposed at right angles to the axis of the output shaft, the axes of these two shafts intersecting one another.

As the input shaft starts to rotate, the clevis starts to rotate about pin 64 thereby starting the harmonic motion of the output shaft. The rotational velocity of the output shaft will increase until it reaches a maximum at the midpoint of the cycle as seen in FIG. 1 wherein clevis 50 and arm 42 are aligned in the same plane with the shaft. The rotational velocity of the output shaft will then decrease and come to a stop as the clevis and arm reach a position 180 from that shown in FIG. 3. The input shaft will then oscillate back through 180 completing the harmonic cycle.

This amplitude of motion of the output shaft can be readily varied by changing the angle a as seen in FIG. 1 between the axis of pin 54 and the axis of the input shaft. In the form of the invention shown in FIGS. 1—3a, various arms 42 may be selectively attached to the input shaft to produce the desired amplitude of motion of the output shaft. On the other hand, a construction may be provided wherein angle a can be manually adjusted at any time during operation of the apparatus without the necessity of disassembling the parts to produce such adjustment. A construction incorporating a manual adjustment for varying the interconnection between the eccentric connecting means and the output connecting means is shown in FIGS. 4—11 inclusive.

Referring now to FIGS. 4—11 inclusive, a modified form of the invention is illustrated including a housing indicated generally by reference numeral 80. An input shaft is indicated generally by reference numeral 82 and is journaled for oscillation within the housing by spherical bearings 84. The lower end 86 of the input shaft is threaded and has a cap 88 threaded thereon.

Referring now to FIG. 6, the input shaft includes an enlarged pinion portion 90 at the upper end thereof. A Central hole 92 is formed through the input shaft and is counterbored as described hereinafter. A pair of diametrically opposite radially extending slots 94 are formed in the upper surface of the pinion portion of the input shaft. A tapped hole 96 is formed in the bottom of each of these slots and extends downwardly within the pinion portion of the input shafts for a purpose hereinafter described. A pair of laterally extending spaced parallel ears 98 extend integrally from the pinion portion 90, these ears having aligned holes 100 formed therethrough.

Figure 5:
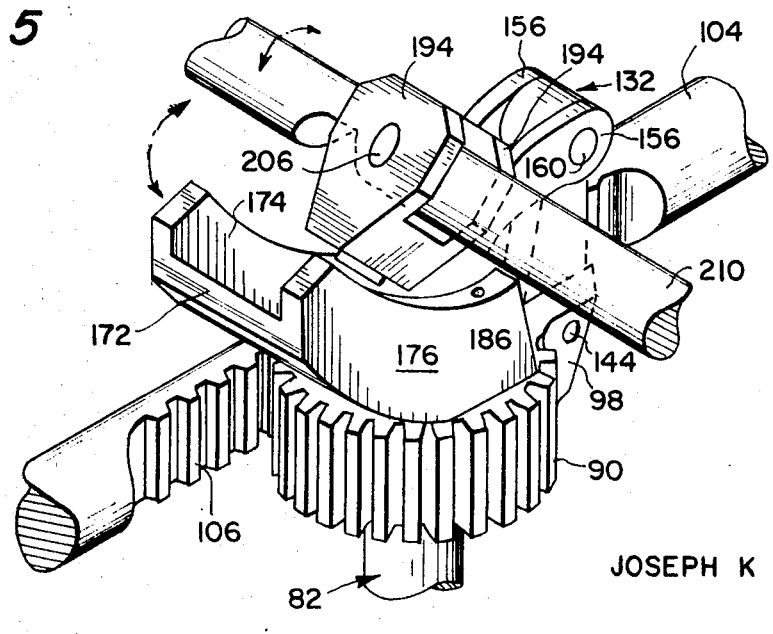
FIG. 5 is a top perspective view of a portion of the structure shown in FIG. 4.

As seen in FIG. 5, a piston 104 is provided having a rack 106 formed thereon which meshes with pinion 90. This piston is adapted to be reciprocated in a cylinder in a manner similar to that discussed in connection with the first embodiment of the invention to produce oscillatory movement of the input shaft.

Figure 4:
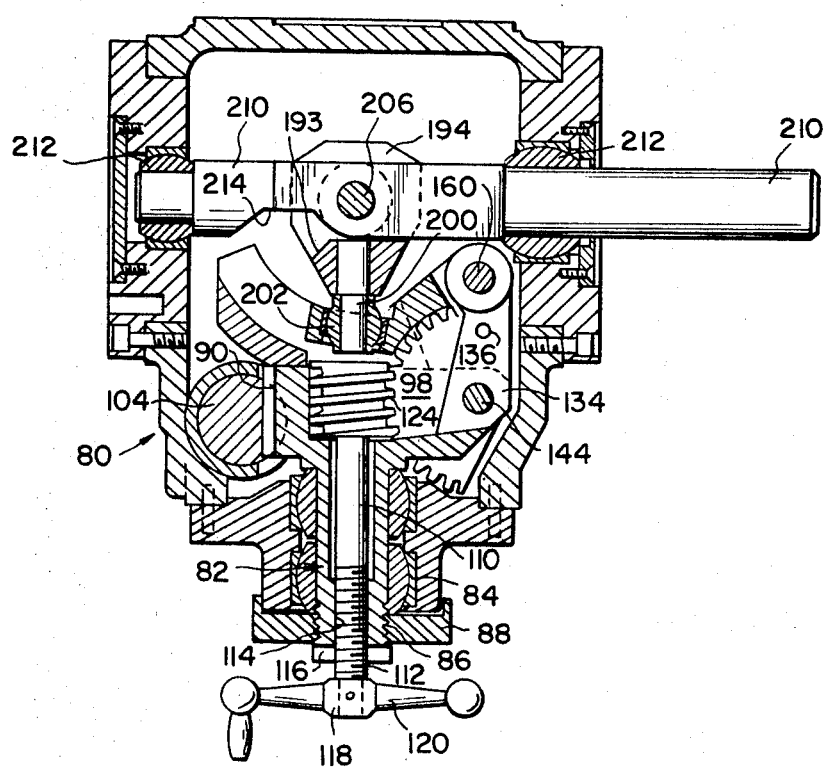
FIG. 4 is a vertical section through a modified form of the invention.

As seen in FIGS. 4 and 7, an adjusting shaft 110 is provided, this adjusting shaft being disposed within the counterbored hole 92 formed through the input shaft. The lower portion 112 of the adjusting shaft is threaded within the lowermost threaded portion 114 of the hole 92 formed through the input shaft. A threaded nut 116 is threaded upon portion 112 of the adjusting shaft. The lowermost portion 118 of the adjusting shaft is squared and is suitably attached to a manually operable handle portion 120 whereby the adjusting shaft may be manually rotated when desired.

A worm 124 is formed at the upper end of the adjusting shaft, and it is apparent that when it is desired to make adjustments in this form of the apparatus, shaft 110 may be manually rotated as desired in order to turn the worm at the upper end of the adjusting shaft.

As seen in FIGS. 4 and 8, worm 124 meshes with a worm gear segment 130. This segment is supported by a member 132 including a pair of spaced parallel legs 134 between which the worm gear segment is adapted to snugly fit. A bolt 136 extends through holes 138 formed in legs 134 and an aligned hole formed in the gear segment. A nut 140 is threaded on the opposite end of the bolt. Holes 142 formed in legs 134 of member 132 are aligned with a corresponding hole formed in the gear segment and pivot pin 144 extends through said last-mentioned holes as well as the holes 100 formed in ears 98 extending laterally form the input shaft.

In this manner, the worm gear segment and member 132 are mounted for pivotal movement about the axis of pin 144 with respect to the input shaft. This pivotal movement is produced by turning the adjustment shaft 110 whereby the worm gear segment is moved in accordance with movements of the worm on the adjustment shaft.

The upper portion of member 132 is provided with a hole 150 which is adapted to be aligned with holes 154 formed in spaced parallel ears 156 of a connecting member 158 as seen in FIG. 9. A pin 160 as seen in FIGS. 4 and 5 extends through aligned holes 150 and 154 thereby pivotally supporting connecting member 158 from the upper end of member 132.

Referring again to FIG. 9, connecting member 158 includes an arcuate cutout portion 164 in the undersurface thereof to provide clearance with the worm gear segment previously described. Connecting member 158 includes an offset integral portion 166 having a counterbored hole 168 formed therethrough.

Referring now to FIG. 10, a guide member is indicated generally by reference numeral 170 and includes a bottom wall 172 having an arcuate upper surface. A pair of spaced parallel sidewalls 174 and 176 extend upwardly from the bottom wall and define therebetween a guideway for guiding movement of connecting member 158 previously described.

A generally circular cutout 178 is formed in the bottom wall and is in communication with a slot 180 formed through the bottom wall and opening through one end of the guide member, these cutouts serving to receive the worm and worm gear when the guide member is mounted in operative position.

A pair of lugs 182 are formed integral with the guide member and extend downwardly therefrom, these lugs being snugly received within the slots 94 formed in the upper part of the pinion portion of the input shaft as aforedescribed. Counterbored holes 184 are formed through the sidewalls 174 and 176 and open through the bottom lugs 182. These holes 184 are aligned with the tapped holes 96 previously described, and cap screws 186 are adapted to extend downwardly through holes 184 and are threaded into holes 96 for retaining the guide member in operative position.

The output connecting means 190 is similar to the clevis previously described and includes a body 192 from which extends a pair of spaced arms 194 having aligned counterbored holes 196 formed therethrough. A cutout 193 is formed on one side of body 192 to provide clearance with respect to the output shaft hereinafter described. A shaft 200 extends from body portion 192 and is journaled within a spherical bearing 202 carried within the hole 168 of connecting member 158. In this manner, the output connecting clevis means 190 is movably interconnected with the connecting member.

As seen most clearly in FIGS. 4 and 5 the clevis is interconnected by a pivot pin 206 with an output shaft 210. As in the previously described modification, pin 206 extends substantially perpendicular to the axis of the output shaft and is journaled within spherical bearings mounted in the arms 194 of the clevis 190.

Output shaft 210 is rotatably journaled in spherical bearings 212 supported within housing 80. A cutout 214 is formed in the output shaft which cooperates with the cutaway portion 193 of the clevis to provide the necessary clearance between the clevis and the output shaft.

It is apparent that the operation of the apparatus shown in FIGS. 4—11 is similar to that of the first-described modification. The latter form of the invention permits adjustment of the angle of pin 200 with respect to the axis of the input shaft. In the position shown in FIG. 4, the pin 200 is directly aligned with the input shaft whereby oscillation of the input shaft will produce no oscillation of the output shaft. It is apparent that by turning handle portion 120, the position of pin 200 may be moved counterclockwise as seen in FIG. 4 through the intermediary of the worm and worm gear segment and the linkage interconnected therewith to progressively increase the amplitude of oscillation of the output shaft.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Harmonic oscillator apparatus comprising an input shaft, means for oscillating said input shaft, an output shaft, the axis of said output shaft being disposed substantially at right angles to the axis of said input shaft at all times with said axes intersecting one another, and connecting means connected between said input shaft and said output shaft whereby substantially uniform oscillatory movement of said input shaft is converted to substantially harmonic oscillatory movement of said output shaft, said connecting means including an eccentric connecting means connected with said input shaft, and an output connecting means rotatably secured to said eccentric connecting means and also being rotatably secured to said output shaft.

2. Apparatus as defined in claim 1 wherein said eccentric connecting means is fixedly interconnected with said input shaft and extends laterally of the axis thereof.

3. Apparatus as defined in claim 2 wherein said eccentric connecting means comprises a rigid arm.

4. Apparatus as defined in claim 1 wherein said output connecting means comprises a clevis pivotally connected with said output shaft for pivotal movement about an axis extending substantially perpendicular to the axis of said output shaft.

5. Apparatus as defined in claim 4 wherein said clevis is interconnected with said output shaft by spherical bearing means.

6. Apparatus as defined in claim 4 wherein said clevis is connected with said eccentric connecting means by spherical bearing means.

7. Apparatus as defined in claim 1 wherein said eccentric connecting means is adjustable for adjusting the amplitude of movement of said output shaft.

8. Apparatus as defined in claim 7 wherein said adjustable means includes a worm and worm gear.

9. Apparatus as defined in claim 8 wherein said adjustable connecting means also includes a movable means interconnected with said worm and worm gear, said movable means being interconnected with said output connecting means, and guide means for guiding movement of said movable means upon operation of said worm and worm gear.